US006416891B1

(12) United States Patent
Condit et al.

(10) Patent No.: US 6,416,891 B1
(45) Date of Patent: Jul. 9, 2002

(54) OPERATING SYSTEM FOR A DIRECT ANTIFREEZE COOLED FUEL CELL POWER PLANT

(75) Inventors: David A. Condit, Avon, CT (US); Richard D. Breault, North Kingstown, RI (US); Leslie L. Van Dine, Manchester; Margaret M. Steinbugler, East Windsor, both of CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/443,267

(22) Filed: Nov. 22, 1999

(51) Int. Cl.[7] ................................................ H01M 8/02
(52) U.S. Cl. .......................................... 429/13; 429/26
(58) Field of Search .............................. 429/12, 13, 17, 429/20, 26, 34, 38

(56) References Cited

U.S. PATENT DOCUMENTS

| 5,176,966 A | 1/1993 | Epp et al. |
| 5,503,944 A | * 4/1996 | Meyer et al. ................. 429/13 |
| 5,700,595 A | 12/1997 | Reiser |
| 6,007,931 A | * 12/1999 | Fuller et al. .................. 429/13 |
| 6,068,941 A | * 5/2000 | Fuller et al. .................. 429/13 |
| 6,120,923 A | * 9/2000 | Van Dine et al. ............. 429/17 |

\* cited by examiner

Primary Examiner—Patrick Ryan
Assistant Examiner—M. Wills
(74) Attorney, Agent, or Firm—Malcolm J. Chisholm, Jr.

(57) ABSTRACT

An operating system for a direct antifreeze cooled fuel cell power plant is disclosed for producing electrical energy from reducing and process oxidant fluid reactant streams. The system includes at least one fuel cell for producing electrical energy from the reducing and oxidant fluid streams; fuel processing components for processing a hydrocarbon fuel into the reducing fluid; a thermal management system that directs flow of a cooling fluid for controlling heat within the plant including a porous water transport plate adjacent and in fluid communication with a cathode catalyst of the fuel cell; a direct antifreeze solution passing through the water transport plate; and, a split oxidant passage that directs the process oxidant stream into and through the fuel cell.

28 Claims, 4 Drawing Sheets

OPERATING SYSTEM FOR A DIRECT ANTIFREEZE COOLED FUEL CELL POWER PLANT

TECHNICAL FIELD

The present invention relates to fuel cells assembled together to form a fuel cell power plant suited for usage in transportation vehicles, portable power plants, or as stationary power plants, and the invention especially relates to an operating system for a fuel cell power plant that minimizes free water and that also utilizes an antifreeze solution passing through the plant to remove heat.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is the aforesaid proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention.

Manufacture of fuel cells utilizing PEM electrolytes typically involves securing an appropriate first catalyst layer, such as a platinum alloy, between a first surface of the PEM and a first or anode porous substrate layer to form an anode electrode adjacent the first surface of the PEM, and securing a second catalyst layer between a second surface of the PEM opposed to the first surface and a second or cathode porous substrate layer to form a cathode electrode on the opposed second surface of the PEM. The anode catalyst, PEM, and cathode catalyst secured in such a manner are well-known in the art, and are frequently referred to as a "membrane electrode assembly", or "M.E.A.", and will be referred to herein as a membrane electrode assembly. In operation of PEM fuel cells, the membrane is saturated with water, and the anode electrode adjacent the membrane must remain wet. As hydrogen ions produced at the anode electrode transfer through the electrolyte, they drag water molecules in the form of hydronium ions with them from the anode to the cathode electrode or catalyst. Water also transfers back to the anode from the cathode by osmosis. Product water formed at the cathode electrode is removed from the cell by evaporation or entrainment into a gaseous stream of either the process oxidant or reducing fluid. In fuel cells containing porous reactant flow fields, as described in U.S. Pat. No. 4,769,297, owned by the assignee of all rights in the present invention, a portion of the water maybe alternatively removed as a liquid through the porous reactant flow field to a circulating cooling fluid.

While having important advantages, PEM cells are also known to have significant limitations especially related to liquid water transport to, through and away from the PEM, and related to simultaneous transport of gaseous reducing fluids and process oxidant fluids to and from the electrodes adjacent opposed surfaces of the PEN. The prior art includes many efforts to minimize the effect of those limitations. Use of such fuel cells assembled together in a well known fuel cell stack with additional components to form a fuel cell power plant in order to power a transportation vehicle gives rise to additional problems associated with water management, such as preventing the product water from freezing, and rapidly melting any frozen water during start up whenever the fuel-cell powered vehicle is operated in sub-freezing conditions. Known fuel cell power plants typically utilize a coolant or thermal management system supplying a flow of cooling fluid through the fuel cell and other plant components to maintain the cell within an optimal temperature range and efficiently distribute heat. Where the cooling fluid is a solution including water it also must be kept from freezing. It is known to utilize an antifreeze solution such as ethylene glycol and water or propylene glycol and water as a cooling fluid in such coolant systems.

However, such antifreeze solutions are known to be adsorbed by and poison the catalysts that form electrodes. Furthermore, those antifreeze solutions have low surface tensions which results in the solutions wetting any wet-proofed support layers adjacent cell catalysts, thereby impeding diffusion of reactant fluids to the catalysts, which further decreases performance of the electrodes. Also, the vapor pressure of those antifreezes is too high, resulting in excessive loss rates of the antifreeze solutions through fuel cell exhaust streams or from steam produced in boilers of fuel processing components of fuel cell power plants. Therefore coolant systems of fuel cells that utilize an antifreeze solution are known to be sealed from the electrodes, so that the solution is not in direct fluid communication with the electrode catalysts.

Sealing the coolant system from direct fluid communication with the cell and hence with the product water formed at the cathode electrode results in decreased cell performance due to less efficient removal of the product water. Fuel cell power plants that utilize sealed coolant plates typically remove product water as an entrained liquid. This requires a tortuous serpentine flow path with a resultant high pressure drop. An example of such a cell is shown in U.S. Pat. No. 5,773,160. That type of cell is not suitable for operating at near ambient reactant pressures which is a preferred operating pressure for many fuel cell systems. The decreased performance of cells with sealed coolant plates requires that additional cells be used to satisfy the design power requirement. The additional cells combined with heavier, sealed coolers results in an increase in weight and volume of a fuel cell power plant which is undesirable for powering a vehicle.

Additionally, where a fuel cell power plant powers a vehicle, the atmosphere serving as a process oxidant stream directed into contact with the cathode electrode will vary significantly in humidity. Consequently, it is known to undertake substantial efforts to humidify the process oxidant and reducing fluid reactant streams in order to minimize water loss from the PEM electrolyte. Known efforts include recycling some of the product water from the cell, and/or directing some of the cooling fluid within the coolant system as a vapor into the process oxidant and/or reducing fluid streams entering the fuel cell. However, with known fuel cells, the humidity enhancing fluid must be free of any antifreeze solutions in order to prevent the antifreeze from poisoning the catalysts. Known fuel cells therefore utilize sealed coolant systems that are isolated from humidification systems. For example, one known fuel cell humidification systems utilizes complex, heavy and large membrane barrier components consisting of uncatalyzed PEM cells upstream of catalyzed cells in order to isolate any antifreeze solution within the cooling fluid or within the product water mixed with cooling fluid from contact with the electrode catalysts. Such efforts to isolate the antifreeze solution add to the cost, weight and volume of the fuel cell.

As fuel cells have been integrated into power plants developed to power transportation vehicles such as automobiles, trucks, buses, etc., maintaining a water balance within the power plant has become a greater challenge because of a variety of factors. For example, with a stationary fuel cell power plant, water lost from the plant may be replaced by water supplied to the plant from off-plant sources. With a transportation vehicle, however, to minimize fuel cell power plant weight and space requirements, the plant must be self-sufficient in water to be viable. Self-sufficiency in water means that enough water must be retained within the plant to offset water losses from gaseous streams of reactant fluids passing through the plant. For example, any water exiting the plant through a cathode exhaust stream of gaseous oxidant or through an anode exhaust stream of gaseous reducing fluid must be balanced by water produced electrochemically at the cathode and retained within the plant.

An additional difficulty in maintaining water self-sufficiency in fuel cell power plants is associated with components necessary to process hydrocarbon fuels, such as methane, natural gas, methanol, gasoline, diesel fuel, etc., into an appropriate reducing fluid that provides a hydrogen rich fluid to the anode electrode. Such fuel processing components of a fuel cell power plant typically include a boiler that generates steam; a steam duct into which the hydrocarbon fuel is injected; and an autothermal reformer that receives the steam and fuel mixture along with a small amount of a process oxidant such as air and transforms the mixture into a hydrogen rich reducing fluid appropriate for delivery to the anode electrode of the fuel cell. The fuel processing components also include system water and energy requirements that are part of an overall water balance and energy requirement of the fuel cell power plant. Water made into steam in the boiler must be replaced by water recovered from the plant such as by condensing heat exchangers in the cathode exhaust stream and associated piping.

A further problem associated with using fuel cell power plants in transportation vehicles arises from a need to have such vehicles capable of commencing immediate operation without any significant warm-up period. Use of a boiler to generate steam in the fuel processing system, however, requires either a warm up period; a substantial energy cost to rapidly initiate boiling; or, an alternative fuel source for the cells or power source for the plant until the fuel processing components are capable of generating adequate fuel.

In some prior art fuel cell power plants utilizing fuel reformers, it is known to direct all or a portion of a cathode exhaust stream into the fuel reformer to thereby minimize water recovery apparatus like condensing heat exchangers, such in as U.S. Pat. No. 3,976,507 issued on Aug. 24, 1976 to Bloomfield, and U.S. Pat. No. 4,128,700 issued on Dec. 5, 1978 to Sederquist. Both of those patents are assigned to the assignee of the present invention, and are hereby incorporated herein by reference. While such older patents show minimization of water recovery efforts, those and other known fuel cell power plants that direct cathode exhaust streams directly into fuel processing components are typically complex pressurized plants that involve use of super-charging turbines mechanically linked to compressors. Therefore those plants have not been shown to be appropriate for utilization in transportation vehicles which require a fuel cell power plant that must operate within water balance through a wide variety of environmental conditions.

A further difficulty associated with cooling fuel cells wherein the cooling fluid contacts cell components is limiting conductivity of the cooling fluid to avoid shunt current corrosion that results from a conductive cooling fluid providing a conductive bridge between cell components. Where the cooling fluid includes water, or similar solvents dissolved metals and other ions must be removed, such as by passing the cooling fluid through, a demineralizer as shown in U.S. Pat. No. 4,344,850 to Grasso, which Patent is owned by the assignee of all rights in the present invention, and which Patent is hereby incorporated herein by reference. However, when such a demineralizer or similar water treatment system is utilized within a fuel cell power plant in a vehicle, the cooling fluid within the water treatment system components must also be protected against freezing. If the cooling fluid were to freeze, it could cause mechanical damage to components of a water treatment system such as a demineralizer; it would require melting during a start-up procedure; and, where a demineralizer includes ion exchange resin beads, the freezing and thawing cooling fluid could cause break up of the beads, resulting in a high pressure drop and impeded flow within the demineralizer. Consequently, the water treatment system for treating the cooling fluid must be freeze protected without adding significant further weight and cost to the fuel cell power plant.

Accordingly there is a need for a fuel cell power plant having fuel processing components that may be operated in sub-freezing conditions that does not require isolating an antifreeze cooling fluid from the cathode and anode catalysts within a sealed coolant system; that minimizes free water within the system that may be frozen whenever the fuel cell is shut down and not operating while subjected to sub-freezing temperatures; that maintains a self-sufficient water balance during operation; that can achieve a rapid generation of power without a requirement of first melting substantial amounts of ice or frozen water; and, that does not require significant increases in weight, volume or cost of the plant.

DISCLOSURE OF THE INVENTION

An operating system for a direct antifreeze cooled fuel cell power plant is disclosed for producing electrical energy from reducing and process oxidant fluid reactant streams. The system includes at least one fuel cell for producing electrical energy from the reducing and process oxidant fluid reactant streams; a thermal management system that directs flow of a cooling fluid for controlling temperature within the plant including a porous water transport plate adjacent and in fluid communication with a cathode catalyst of the fuel cell and including a direct antifreeze solution passing through the water transport plate; fuel processing components including an autothermal reformer and a burner for processing a hydrocarbon into the reducing fluid; and, a split oxidant passage that directs the process oxidant stream through the fuel cell and that also directs a reformer feed portion of the process oxidant stream through at least one reformer feed portion of the split oxidant passage into fluid communication with the fuel processing components, and that also directs an exhaust portion of the process oxidant stream through an exhaust branch of the split oxidant passage into a plant exhaust passage. Reformer feed branches of the split oxidant passage may direct the process oxidant stream into fluid communication with the fuel processing components before or after the process oxidant stream passes through the fuel cell.

In a first alternative embodiment of the operating system, an anode exhaust passage is included that receives an anode exhaust stream exiting the fuel cell and directs the anode exhaust stream into the burner, then directs the combusted burner exhaust stream from the burner into heat exchange relationship with the reformer feed portion of the process oxidant stream within the reformer feed branch of the split oxidant passage, and then directs the combusted burner exhaust stream into the plant exhaust passage to mix with the exhaust portion of the process oxidant stream to become a plant exhaust stream. In an additional alternative embodiment, the system includes a direct mass and heat transfer device secured in fluid communication with both an oxidant inlet that directs the process oxidant stream into the split oxidant passage upstream of the fuel cell and also with the plant exhaust passage so that the device directly transfers through a mass transfer medium mass and heat such as water vapor exiting the plant in a plant exhaust stream within the plant exhaust passage back into the plant within the process oxidant stream, wherein the mass transfer medium may be the direct antifreeze solution cooling fluid directed from the thermal management system to pass through the direct mass and heat transfer device. In yet a further alternative embodiment, the system may include a fuel processing thermal exchange loop for removing heat from the fuel processing components that may also be secured in heat exchange relationship with the thermal management system.

In an additional alternative embodiment the operating system for a direct antifreeze cooled fuel cell power plant includes a water treatment system having a demineralizer in fluid communication with the cooling fluid, and having a degasifier also in fluid communication with the cooling fluid that passes the cooling fluid in mass transfer relationship with the process oxidant stream so that dissolved gases in the cooling fluid transfer from the cooling fluid into the process oxidant stream.

In a further embodiment, the direct antifreeze solution passing through the water transport plate may be directed to flow at a pressure that is less than a pressure of the process reactant streams passing adjacent the water transport plate. A preferred fuel cell operates at near ambient pressure and the process oxidant stream and reducing fluid stream are pressurized to 1 to 2 pounds per square inch gauge (hereafter "PSIG") above ambient pressure, while the direct antifreeze solution is directed to flow through the water transport plate at about 1 to 2 PSIG below ambient pressure. Such a positive pressure differential between the process oxidant stream and the antifreeze solution within the water transport plate further assists movement of product water formed at a cathode catalyst of the fuel cell into the water transport plate. The positive pressure differential also limits movement of any liquid antifreeze solution flowing within the water transport plate from flowing out of the water transport plate into the higher pressure process reactant streams passing within reactant flow fields defined adjacent to and/or within fluid communication with the water transport plate.

The direct antifreeze solution of the invention may be any organic antifreeze solution that is non-volatile and does not wet a hydrophobic substance such as "Teflon" at cell operating temperatures. For purposes herein, "non-volatile" is defined to mean that the antifreeze solution sustains a loss of less than 10% of its antifreeze for every 500 operating hours of the fuel cell power plant at fuel cell operating temperatures. Alternatively, a first preferred direct antifreeze solution may be a special direct antifreeze solution having the following characteristics: 1. a freezing point of at least −20 degrees Fahrenheit (hereafter "°F."); 2. a surface tension greater than 60 dynes per centimeter (hereafter "dyne/cm") at a cell operating temperature of about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred antifreeze solution may be an alkanetriol direct antifreeze solution, and in particular an alkanetriol selected from the group consisting of glycerol, butanetriol, and pentanetriol. The direct, special and alkanetriol direct antifreeze solutions minimize movement of the antifreeze as a vapor out of the water transport plate into contact with the cathode or anode catalysts, and also minimize direct antifreeze solution loss from the thermal management system, direct mass and heat transfer system, and water treatment system of the power plant as well as from any other fuel cell components such as the plant exhaust stream exiting the cell.

Accordingly it is a general object of the present invention to provide an operating system for a direct antifreeze cooled fuel cell power plant that overcomes deficiencies of the prior art.

It is a more specific object to provide an operating system for a direct antifreeze cooled fuel cell power plant that eliminates need for a separate sealed thermal management system for operation in sub-freezing conditions.

It is another object to provide an operating system for a direct antifreeze cooled fuel cell power plant that processes a hydrogen rich reducing fluid without any free liquid water and without a boiler for generating steam.

It is a further object to provide an operating system for a direct antifreeze cooled fuel cell power plant that transfers water exiting a fuel cell of the plant in oxidant and anode exhaust streams to components for processing hydrocarbon fuels utilized by the fuel cell.

It is yet another object to provide an operating system for a direct antifreeze cooled fuel cell power plant that eliminates any need for uncatalyzed membrane barrier components of a humidification system between an antifreeze cooling fluid and the fuel cell.

It is another object to provide an operating system for a direct antifreeze cooled fuel cell power plant that minimizes free liquid water that may freeze when the fuel cell is not operating in sub-freezing conditions.

It is yet a further object to provide an operating system for a direct antifreeze cooled fuel cell power plant that directly transfers mass and heat leaving the power plant back into the plant through a mass transfer medium supplied from a thermal management system.

These and other objects and advantages of the present operating system for a direct antifreeze cooled fuel cell power plant will become more readily apparent when the following description is read in conjunction with the accompanying drawings.

DESCRIPTION OF THE PREFERRED EMBODIMENTS

Figure 1:
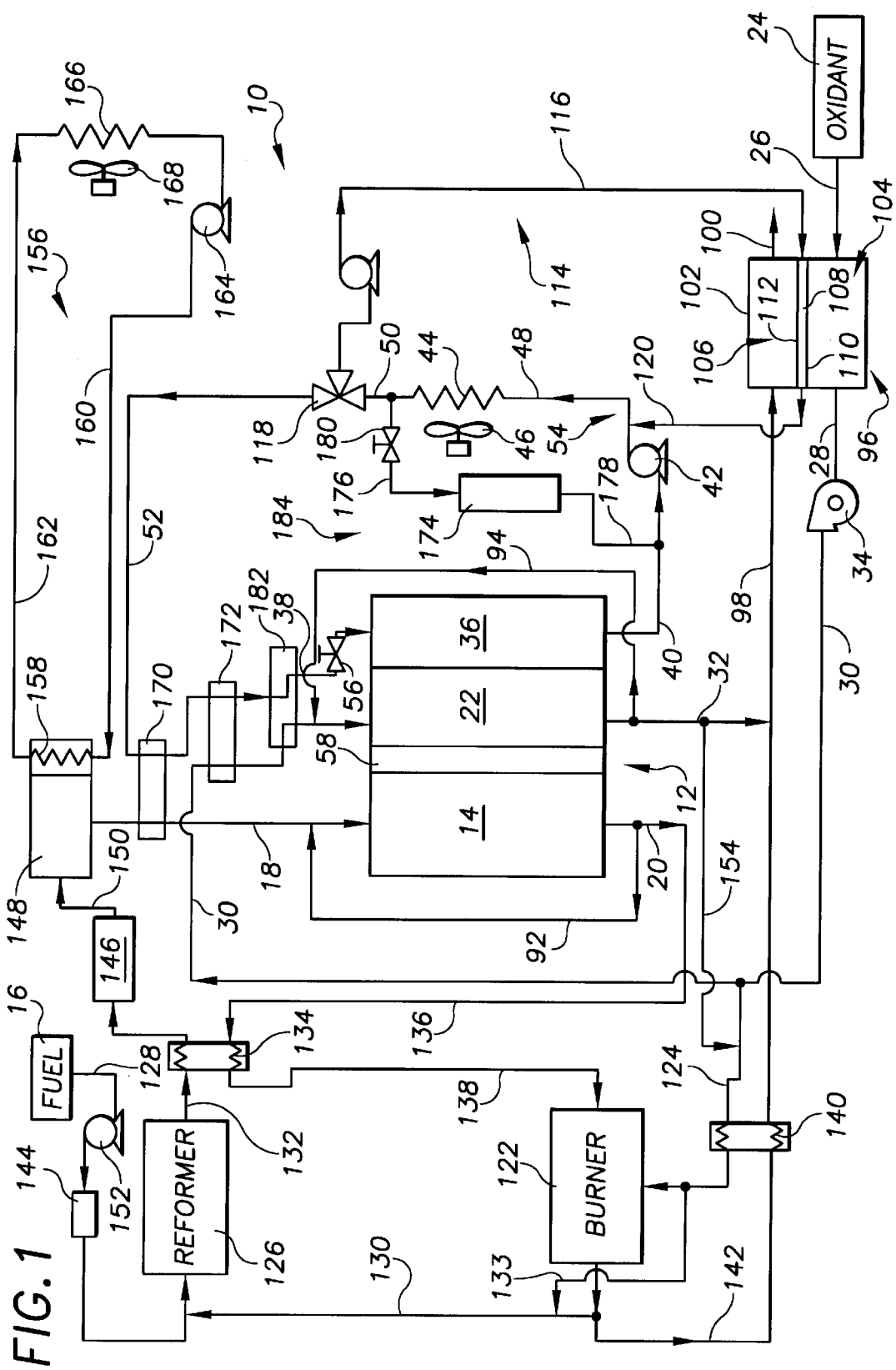
FIG. 1 is a schematic representation of a first embodiment of an operating system for a direct antifreeze cooled fuel cell power plant constructed in accordance with the present invention.

Referring to the drawings in detail, a first embodiment of an operating system for a direct antifreeze cooled fuel cell power plant of the present invention is shown in FIG. 1, and is generally designated by the reference numeral 10. The plant 10 includes at least one fuel cell means for producing electrical energy from reducing fluid and process oxidant reactant streams such as fuel cell 12. The fuel cell 12 includes an anode flow field 14 that receives a reducing fluid directed from a fuel supply component 16 through a fuel passage inlet 18 to flow through the anode flow field 14 and leave the cell 12 through an anode exhaust passage 20. The cell also includes a cathode flow field 22 that receives a process oxidant stream directed from an oxidant supply component 24 through an oxidant inlet 26 in fluid communication with a split oxidant passage 28, and through an inlet branch 30 of the split oxidant passage 28 into the cathode flow field 22. The process oxidant stream passes out of the cathode flow field 22 and fuel cell 12 within an exhaust branch 32 of the split oxidant passage 28.

An oxidant blower 34 may be positioned on the split oxidant passage 28 to variably flow the gaseous oxidant stream into the fuel cell 12. It is stressed, however, that preferably such a blower 34 only increases operating pressures of the process oxidant stream to a range of from atmospheric pressure to about 1.0–2.0 pounds per square inch above atmospheric pressure, or from about 14.7 to about 16.7 pounds per square inch atmospheric (hereafter "PSIA"). Although the operating system for a direct antifreeze cooled fuel cell power plant 10 preferably operates at about ambient pressure, it is anticipated that the system 10 may also be effectively operated at pressures of several atmospheres.

A porous water transport plate 36 is secured adjacent the cathode flow field 22 and receives a cooling fluid such as a direct antifreeze solution through a coolant feed line 38 and passes the solution out of the plate 36 through a coolant discharge line 40. The water transport plate 36 serves to cool the fuel cell means 12, and may be referred to occasionally as a "cooler plate". The coolant feed line 38 and coolant discharge line 40 may be in fluid communication with a coolant pump 42 and a coolant heat exchanger 44 having a coolant fan 46, so that the coolant pump 42 pumps the cooling fluid through a coolant feed line first extension 48, through the coolant heat exchanger 44, a coolant feed line second extension 50 and third extension 52, the coolant feed line 38, water transport plate 36 and coolant discharge line 40 back to the coolant pump 42. The coolant pump 42, heat exchanger 44 and coolant feed lines 38, 48, 50, 52, water transport plate 36 and coolant discharge line 40 form part of a thermal management system means 54 for controlling temperature within the operating system for a direct antifreeze cooled fuel cell power plant 10. While the thermal management system means 54 shows the cooling fluid direct antifreeze solution cycling through the water transport plate 36, alternatively, the thermal management system may direct the cooling fluid through the water transport plate without repeatedly cycling all of the cooling fluid through the coolant feed lines 38, 48, 50, 52, coolant heat exchanger 44, and water transport plate 36. In such an embodiment of the thermal management system 54, the cooling fluid may be part of a more elaborate system, such as an alternative embodiment discussed below.

The operating system for a direct antifreeze cooled fuel cell power plant 10 may also include a pressure control means for maintaining a positive pressure differential between the reactant streams passing through the anode and cathode flow fields 14, 22 and the cooling fluid passing through the water transport plate 32. The pressure control means may include the coolant pump 42 coordinated with a pressure control valve means for maintaining a specific pressure of the cooling fluid within the third extension 52 of the coolant feed line down stream of the valve means, water transport plate 36 and coolant discharge line 40, such as a pressure control valve 56 secured between the coolant pump 42 and the water transport plate 36, such as on the second extension 50 of the coolant feed line 38. As is well-known, the pressure control valve 56 may be set manually, automatically, or, for example, may be electro-mechanically adjusted based upon a reference pressure within the process oxidant stream within the cathode flow field 22 to restrict flow through the valve 56 so that the stream of cooling fluid drawn into the coolant pump 42 from the coolant feed line 33, water transport plate 36, coolant discharge line 40 and coolant heat exchanger 44 is at a pressure lower than the pressure of the process oxidant stream within the cathode flow field 22. Additional pressure control means for purposes herein may include any well-known mechanism that can reduce pressure of a liquid stream below a reference pressure of a gaseous stream, such as disclosed in U.S. Pat. No. 5,700,595, issued on Dec. 23, 1997 to Reiser and assigned to the assignee of the present invention, which patent is hereby incorporated herein by reference. The materials making up the thermal management system 54 may be manufactured of standard materials well-known in the art such as heat exchangers common to automobile technology, and piping and valving well-known in the chemical processing arts, etc.

The fuel cell means 12 also includes a membrane electrode assembly 58 (hereafter occasionally referred to as "M.E.A." for convenience) secured between the anode flow field 14 and cathode flow field 22 that facilitates an electrochemical reaction involving the reducing fluid and oxidant stream to generate electrical energy that is conducted through a standard circuit (not shown) to an energy consuming load, such as an electric motor (not shown) to power, for example, a transportation vehicle (not shown). It is also well-known to secure the fuel cell 12 adjacent a plurality of similar fuel cells (not shown) to form a cell stack assembly enclosed within a frame structure that defines manifolds for directing the reducing fluid, process oxidant, and cooling fluid streams into and out of the fuel cell 12 in a manner well-known in the art.

Figure 2:
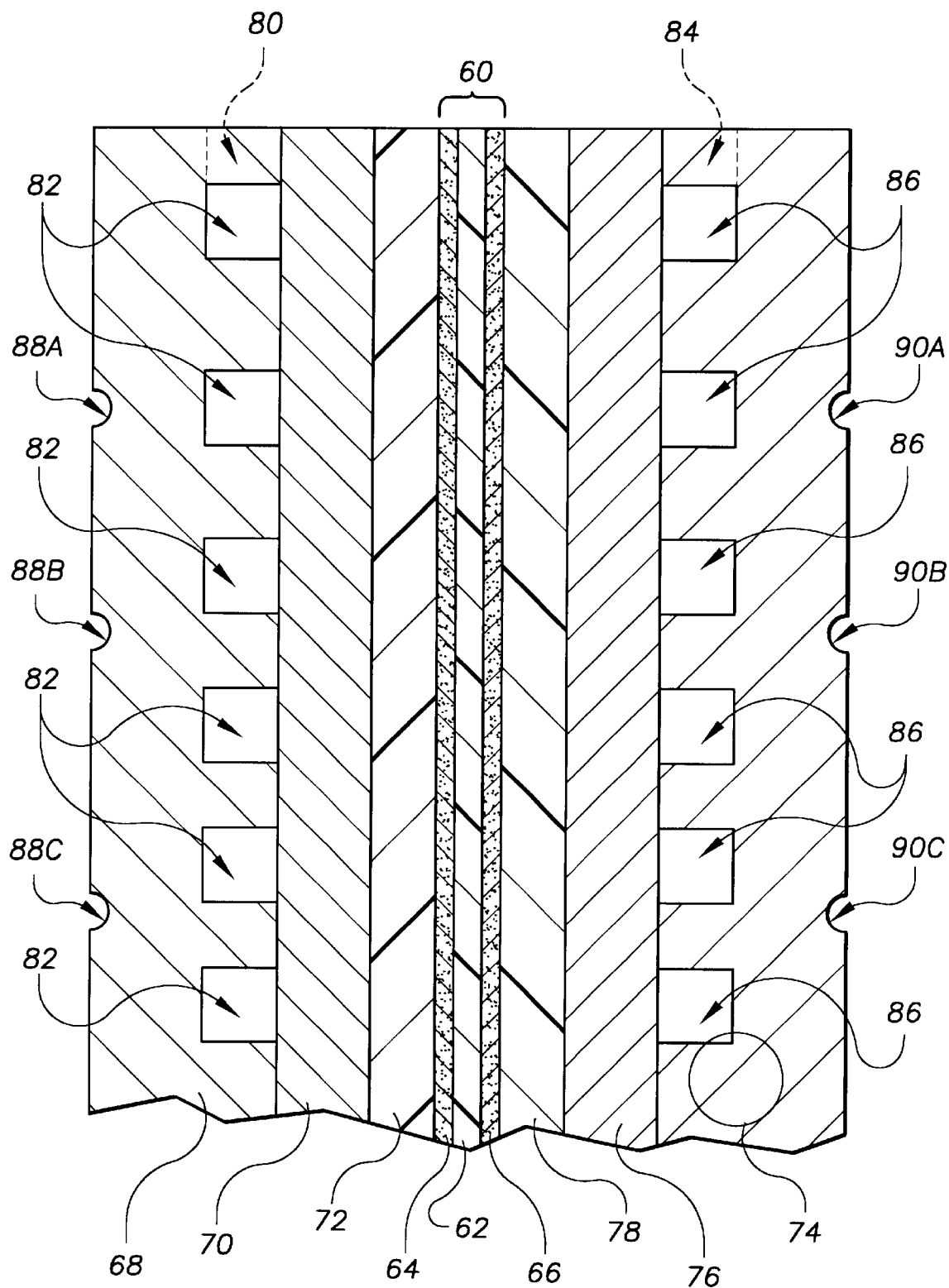
FIG. 2 is a schematic, cross-section, fragmentary view of fuel cell components of a fuel cell of an operating system for a direct antifreeze cooled fuel cell power plant of the present invention.

An exemplary M.E.A. 60 is shown in greater detail in FIG. 2, and for purposes herein is defined to include an electrolyte 62 such as a proton exchange membrane ("PEM"), an anode catalyst 64, and a cathode catalyst 66 secured on opposed sides of the electrolyte 62. The fuel cell means 12 may also include an anode support means that is secured in direct fluid communication with the anode catalyst 64 between an anode water transport plate 68 and the anode catalyst 64 for passing the reducing fluid stream adjacent the anode catalyst 64. The anode support means may include one or more porous layers, such as a porous anode substrate 70, a porous anode diffusion layer 72, or both the porous anode substrate 70 and porous anode diffusion layer 72 secured adjacent each other between the anode water transport plate 68 and anode catalyst 64 (as shown in FIG. 2). One or both of the porous layers 70, 72 may be wetproofed depending upon cell 12 performance requirements. In a preferred embodiment, at least one of the porous layers 70, 72 of the anode support means is wetproofed to make the pores hydrophobic.

The fuel cell 12 may also include a cathode support means that is secured in direct fluid communication with the cathode catalyst 66 between a cathode water transport plate 74 and the cathode catalyst 66 for passing the process oxidant stream adjacent the cathode catalyst 66. The cathode support means may include one or more porous layers, such as a porous cathode substrate 76, a porous cathode diffusion layer 78, or both the porous cathode substrate 76 and porous cathode diffusion layer 78 secured adjacent each other between the cathode water transport plate 74 and cathode catalyst 66. One or both of the porous layers 76, 78 of the cathode support means may be wetproofed depending upon performance requirements of the cell 12. In a preferred embodiment, at least one of the porous cathode support layers 76, 78 of the cathode support means is wetproofed to make the pores hydrophobic.

The porous cathode substrate 76 and porous anode substrate 70 may be porous carbon-carbon fibrous composites having a porosity of about 65% to about 75%, and may be wetproofed by a hydrophobic substance such as "Teflon" to a concentration of approximately 0.18 grams per cubic centimeter. The porous cathode gas diffusion layer 78 and porous anode diffusion layer 72 may be about a 50% carbon material and about 50% hydrophobic material such as Teflon. The porous cathode water transport plate 74 is in direct fluid communication with the porous cathode substrate 76, porous cathode diffusion layer 78 and the cathode catalyst 66. Similarly, the porous anode water transport plate 68 is in direct fluid communication with the porous anode substrate 70, porous anode diffusion layer 72 and the anode catalyst 64.

It is pointed out that an anode flow field (shown schematically in the FIG. 1 embodiment at reference numeral 14), may consist, in the FIG. 2 schematic representation, of a fuel inlet 80, and a plurality of reducing fluid or fuel flow channels 82 defined within the anode water transport plate 68. Similarly, a cathode flow field may consist of an oxidant inlet 84, and a plurality of oxidant flow channels 86 defined within the cathode water transport plate 74. The anode flow field 14 and cathode flow field 22 may also consist of cavities, differing channels or grooves well-known in the art and defined within fuel cell components and a fuel exit and oxidant exit to direct the fuel and process oxidant streams to pass into, through and out of the cell 12 in contact with the anode and cathode catalysts 64, 66. As shown in FIG. 2, the porous anode and cathode water transport plates 68, 74 may be structured to cooperate with adjacent water transport plates (not shown) so that anode side coolant channels 88A, 88B and 88C defined within the anode water transport plate 68, and cathode side coolant channels 90A, 90B, and 90C defined within the cathode water transport plate 74 may cooperate in mirror-image association with coolant channels of the adjacent water transport plates of adjacent fuel cells (not shown) in a cell stack assembly to form a network of coolant channels for delivering a cooling fluid stream to the water transport plates 68, 74.

In operation of the fuel cell means 12, the anode side coolant channels 88A, 88B, 88C and cathode side coolant channels 90A, 90B, 90C are in fluid communication with the coolant feed line 38 and coolant discharge line 40, so that a cooling fluid stream from the coolant feed line 38 passes through the anode and cathode coolant channels, and into the anode and cathode water transport plates 68, 74 to saturate the pore volume of the water transport plates. The cooling fluid stream then passes into the coolant discharge line 40. By filling the open pore volume of the anode and cathode water transport plates 68, 74, the cooling fluid stream of the direct antifreeze solution forms a gas barrier or seal preventing the gaseous reducing fluid in the reducing fluid fuel channels 82 from flowing into oxidant channels in an adjacent cell. Optionally wetproofing the porous anode substrate 70 layer and/or porous anode diffusion layer 72 further restricts movement of any liquid antifreeze solution out of the anode water transport plate 68 through the anode substrate and diffusion layers 70, 72 into contact with the anode catalyst 64.

Similarly, optionally and preferably wetproofing the porous cathode substrate layer 76 and/or cathode diffusion layer 78, further restricts movement of any liquid direct antifreeze solution out of the cathode water transport plate 74 through the cathode substrate 76 and cathode diffusion layer 78 and into contact with the cathode catalyst 66. Additionally, as the fuel cell 12 operates, product water formed at the cathode catalyst 66 is removed as water vapor into the process oxidant stream flowing through the cathode flow field or oxidant channels 86 defined within the cathode water transport plate 74, or as liquid into the cathode water transport plate 74. Therefore, much of the product water moves out of the cathode flow field 86 and into the direct antifreeze solution coolant stream passing through the porous cathode water transport plate 74, especially when the pressure control valve means 56 is causing a positive pressure differential between the reducing fluid and process oxidant reactant streams within the anode and cathode flow fields 14, 22 or reducing fluid channels 82 or oxidant channels 86 and the antifreeze coolant stream within the cathode water transport plate 74 adjacent the fuel and oxidant flow channels 82, 86.

The direct antifreeze solution may be any organic antifreeze solution that does not wet the wetproofed cathode substrate and that is essentially non-volatile at cell operating temperatures. For purposes herein, "non-volatile" is defined to mean that the antifreeze solution sustains a loss of less than 10% of its antifreeze for every 500 operating hours of the fuel cell at fuel cell operating temperatures.

Alternatively, a first preferred direct antifreeze solution may be a special direct antifreeze solution having the following characteristics: 1. a freezing point of at least −20 degrees Fahrenheit (hereafter "° F."); 2. a surface tension greater than 60 dynes per centimeter (hereafter "dyne/cm") at about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred antifreeze solution may be an alkanetriol direct antifreeze solution, and in particular an alkanetriol selected from the group consisting of glycerol, butanetriol, and pentanetriol. The alkanetriol direct antifreeze may be an antifreeze solution containing any alkanetriol.

As shown in FIG. 1, the first embodiment of the operating system for a direct antifreeze cooled fuel cell power plant 10 includes several separate components that serve to enhance the humidity of the reducing fluid and process oxidant streams to maintain adequate water content of a PEM electrolyte 62, in addition to facilitating water self-sufficiency of the plant 10. Self-sufficiency in water means that enough water must be retained within the plant to offset losses from plant exhaust streams to efficiently operate the plant. For example, any water exiting the plant through a plant exhaust stream consisting of a cathode exhaust stream of gaseous oxidant and/or an anode exhaust stream of gaseous reducing fluid must be balanced by water produced electrochemically at the cathode. One such component to enhance proper humidification of a PEM electrolyte 62 is an anode exhaust recycle line means 92 for selectively recycling a portion of the anode exhaust stream leaving the anode flow field 14 within the anode exhaust passage 20 back into the fuel inlet passage 18, including the anode recycle line 92 and optionally an anode recycle valve and blower means (not shown) secured to the line 92 for selectively directing a portion of the anode exhaust stream from the anode exhaust passage 20 to the fuel inlet passage 18. An additional and similar component is a cathode recycle line means 94 for selectively recycling a portion of a cathode exhaust stream leaving the cathode flow field 22 within the exhaust branch 32 of the split oxidant passage 28 back into the inlet branch 30 of the split exhaust passage 28, as shown in FIG. 1, including the cathode recycle line 94 and a cathode recycle valve and blower means (not shown) for selectively recycling a portion of the cathode exhaust stream from the exhaust branch 32 to the inlet branch 30 of the split oxidant passage 28.

A further component utilized for maintaining water self-sufficiency of the system 10 is a direct mass and heat transfer device means for directly transferring mass from a first fluid stream passing through the device to a second fluid stream passing through the device, such as a direct mass and heat transfer device 96 secured in fluid communication with both the oxidant inlet 26 and a plant exhaust passage 98 that receives the cathode exhaust stream from the exhaust branch 32 of the split oxidant passage 28. The plant exhaust passage 98 directs a plant exhaust stream into the mass and heat transfer device 96 and a plant exhaust vent 100 directs the plant exhaust stream out of the device 96 and out of the operating system for a direct antifreeze cooled fuel cell power plant 10. The oxidant inlet 26 directs the process oxidant stream from the oxidant supply 24 into the mass and heat transfer device 96, and the split oxidant passage 28 directs the process oxidant stream from the direct mass and heat transfer device 96 to, through and out of the fuel cell 12 and into the plant exhaust passage 98.

The mass and heat transfer device 96 includes a separator housing or structure 102 that defines an oxidant chamber 104 through which the process oxidant stream passes, and an exhaust chamber 106 through which the exhaust stream passes. The structure 102 also secures a mass transfer medium means for sorbing a fluid substance consisting of polar molecules within the plant exhaust stream and for desorbing the fluid substance consisting of polar molecules into the process oxidant stream. The structure 102 may be a separator housing means for supporting the mass transfer medium means in mass transfer relationship with the plant exhaust stream and process oxidant stream so that both streams contact opposed surfaces of the mass transfer medium means, and for preventing bulk mixing of the plant exhaust and process oxidant streams. An exemplary mass transfer medium means includes a fine pore enthalpy exchange barrier 108 secured in mass transfer relationship between the oxidant and exhaust chambers 104, 106 so that the process oxidant stream within the oxidant chamber 104 passes adjacent an inlet surface 110 of the barrier and the plant exhaust stream within the exhaust chamber 106 passes adjacent an exhaust surface 112, and the structure 102 secures the fine pore enthalpy exchange barrier 108 as a barrier between the oxidant and exhaust streams (shown schematically in FIG. 1) to prevent bulk mixing of the streams.

The mass and heat transfer device means may also include a liquid transfer medium supply means for supplying a liquid transfer medium to the fine pore enthalpy exchange barrier 108, such as a transfer medium circulating loop 114 that supplies a portion of the direct antifreeze solution to the fine pore enthalpy exchange barrier 108. The transfer medium loop 114 may include a liquid transfer medium feed line 116 secured between the exchange barrier 108 and the coolant feed line, such as at a first coolant valve means 118 secured to the second extension 50 of the coolant feed line 38, for selectively feeding a portion of the direct antifreeze solution to the fine pore enthalpy exchange barrier 108. The transfer medium loop also includes a liquid transfer medium return line 120 secured between the exchange barrier 108 and the coolant feed line first extension 48, so that the direct antifreeze solution may be cycled through the transfer medium means exchange barrier 108 for replacement and treatment, as described in more detail below.

A preferred fine pore enthalpy exchange barrier 108 includes a support matrix means for defining hydrophilic pores having a pore-size range of between 0.1 - 100 microns that results in the barrier having a bubble pressure of greater than 0.2 pounds per square inch ("p.s.i.") when the hydrophilic pores are wetted by a liquid transfer medium such as the direct antifreeze solution, and for being chemically stable in the presence of the liquid transfer medium. The bubble pressure requirement of the support matrix is dictated by the specific design of the fuel cell 12 and the mass and heat transfer device 96 which set a maximum pressure differential between the plant exhaust stream within the exhaust passage 106 and the process oxidant stream within the oxidant inlet line 26. In operation of the direct mass and heat transfer device 96, as the plant exhaust stream passes through the exhaust chamber 106, water vapor from the fuel cell 12 is sorbed by the liquid transfer medium direct antifreeze solution within the fine pore enthalpy exchange barrier 108 and desorbed from the liquid transfer medium into the process oxidant stream within the oxidant chamber 104, thereby adding heat to, and humidifying the process oxidant stream before it enters the cathode flow field 22.

The operating system 10 also includes fuel processing component means for processing hydrocarbon fuels into reducing fluids appropriate for providing fuel to an anode electrode of the fuel cell 12. Exemplary hydrocarbon fuels for powering such a fuel cell 12 include gasoline, diesel fuel, butane, propane, natural gas, methanol, ethanol, etc. The fuel processing component means may include: a burner 122 that may be a conventional or preferably a catalytic burner (labeled "BURNER" in FIGS. 1 and 3 for convenience) that oxidizes any excess reducing fluid such as hydrogen fed to the burner 122 as an anode exhaust stream through the anode exhaust passage 20 after passing through the anode flow field 26; a first reformer feed branch 124 of the split oxidant passage 28 secured in fluid communication with the inlet branch 30 of the split oxidant passage 28 and with the burner 122 that directs a portion of the process oxidant stream into the burner; a reformer 126 that may be an autothermal reformer or other well-known reformer means(labeled "REFORMER" in FIGS. 1 and 3) that receives fuel from a fuel delivery line 128 secured between the fuel source 16 and the reformer 126 and that receives a combusted burner exhaust stream from the burner 122 in a reformer feed line 130 between the burner 122 and the reformer 126; and a reformed fuel discharge line 132 that directs reformed fuel from the reformer 126 into the reducing fluid inlet 18. In some instance, as described below, the reformer means 126 for reforming the fuel into the reducing fluid may need additional oxidant. Therefore the combusted burner exhaust stream within the reformer feed line 130 may be supplemented by, or replaced by, a portion of the process oxidant stream directed to the reformer feed line 130 through a burner bypass line 133 secured between the first reformer feed branch 124 upstream of the burner 122 and the reformer feed line 130.

The fuel processing component means may also include a first heat exchanger 134 that receives the anode exhaust stream within a first extension 136 of the anode exhaust passage 20 and passes the anode exhaust stream in heat exchange relationship with the reformed fuel within the reformed fuel discharge line 132, so that the anode exhaust stream is heated by the reformed fuel and then is directed to the burner 122 from the first heat exchanger 134 within a second extension 138 of the anode exhaust passage 20. The fuel processing component means may also include a second heat exchanger 140 that passes the first reformer feed portion of the process oxidant stream within the first reformer feed branch 124 of the split oxidant passage 28 in heat exchange relationship with a portion of the combusted burner exhaust stream within a burner discharge line 142 secured between the burner 122 and the plant exhaust passage 98 so that the combusted burner exhaust stream heats the first reformer feed portion of the process oxidant stream within the first reformer feed branch 124 upstream of the burner 122. Any unused hydrogen in the anode exhaust stream is oxidized to produce water in the burner 122 and to thereby heat the anode exhaust stream leaving the burner 122 as the combusted burner exhaust stream and to render the burner exhaust stream leaving the burner 122 non-flammable.

The fuel processing component means may include components that are well-known in conventional steam reforming, having differing reformer means for reforming a hydrocarbon fuel, such as an autothermal reformer, a steam reformer or a partial oxidation reformer that work with the other fuel processing component means to reform various hydrocarbon fuels. The fuel processing components are of relatively conventional design that are generally well-known in the chemical processing arts wherein there is a need to generate hydrogen enriched fluid from common hydrocarbon sources. For example, an autothermal reformer in such processes typically burns a portion of the fuel received to reach temperatures approximating 1,700 degrees Fahrenheit (hereafter "° F."). The chemical process in an autothermal reformer requires the presence of fuel, oxygen and water as is well known. In the embodiment described above and shown in FIG. 1 for such an autothermal reformer, the fuel is supplied to the reformer 126 from the fuel source 16; the oxygen is supplied through the burner exhaust stream within the reformer feed line 130, the first reformer feed branch 24 and the inlet branch of the split oxidant passage 28 and oxidant source 24, as well as from the cathode exhaust stream within the exhaust branch 32 and second reformer feed branch 154 of the split oxidant passage 28; and the water is supplied to the reformer means 126 as a vapor from the burner exhaust stream within the reformer feed line 130. The water consists of water formed in the combustion process in the burner 122, water vapor contained in the anode exhaust stream within the anode exhaust passage 20, and water vapor contained in the cathode exhaust stream in the exhaust branch 32 of the split oxidant passage 28. By providing water to the reformer means 122 in the described manner, a need for a conventional steam generating boiler is eliminated with attendant problems relating to freezing and heating, as discussed above.

While the present operating system 10 has been described with fuel processing component means utilizing as an example an autothermal reformer, the system 10 may also utilize reformer means for reforming a hydrocarbon fuel in to the reducing fluid, including other reformers known in the art, and the specific configuration of FIG. 1 is only one embodiment. For example steam and/or partial oxidation reformers may also be utilized. In a steam reformer, the reactants are a hydrocarbon fuel and water vapor. The burner exhaust stream in the reformer feed line 130 may be adjusted through known controls to contain only adequate oxygen to combust excess hydrogen in the anode exhaust stream, so that only water vapor will remain in the burned exhaust stream within the reformer feed line 130, thereby effectively supporting a steam reformer. If a partial oxidation reformer were to be utilized, the reactants would be the hydrocarbon fuel and oxygen. To operate such a reformer, the burner bypass line 133 would be controlled to supply oxygen to the reformer 126, and the burner exhaust stream would be adjusted through well known controls to direct all of the burner exhaust stream through the burner discharge line 142 and into the plant exhaust passage 98. By use of the phrase "reformer means for reforming a hydrocarbon fuel into a reducing fluid", it is meant to include the above described and known reformers that can achieve that function in the described working environment.

Additional fuel processing component means may include a de-sulfurizer 144 secured on the fuel delivery line 128 to remove any sulfur from the hydrocarbon fuel; a water shift reactor 146 and a selective oxidizer 148, which are secured in series in fluid communication with and along an extension 150 of the reformed fuel discharge line 132 and that direct the reformed fuel into the reducing fluid inlet 18 in order to minimize carbon monoxide levels in the reducing fluid stream entering the anode flow field 22, as is well-known in the art. The system 10 may also include a fuel pump 152 for selectively pumping fuel from the fuel storage component 16 through the fuel processing component means.

It is well known that the primary reaction within the selective oxidizer 148 is the oxidation of carbon monoxide to carbon dioxide. This reaction is exothermic and the heat of reaction is typically removed by a heat exchanger, such as the third heat exchanger 158, that may be incorporated with the selective oxidizer (as shown in FIG. 1), or alternatively may be secured downstream of the selective oxidizer to cool the reformed fuel before it enters the fuel cell 12. Such a selective oxidizer typically reduces the carbon monoxide content from a selective oxidizer inlet concentration of about 10,000 ppm to approximately 10 ppm at an exit of the selective oxidizer. The operating temperatures of selective oxidizers are typically in the range of 200° F.–300° F. U.S. Pat. No. No. 5,330,727 describes a typical selective oxidizer apparatus for removing carbon monoxide from a fuel stream, which Patent is owned by the assignee of all rights in the present invention, and which Patent is hereby incorporated herein by reference.

The split oxidant passage 28 may be a split oxidant passage means for selectively splitting reformer feed and exhaust portions of the oxidant stream passing into and out of the fuel cell 12 into reformer feed and exhaust branches of the split oxidant passage means for delivery of the reformer feed and exhaust portions of the oxidant stream to differing components of the operating system 10. The split oxidant passage means 28 may include control means well-known in fluid conduction and control art for regulating proportions of the oxidant stream delivered to components of the system 10, such as temperature and/or humidity sensors in communication with standard electromechanical valves, etc. The split oxidant passage means 28 includes the first reformer feed branch 124 that directs the first reformer feed portion of the oxidant stream from the inlet branch 30 of the split oxidant passage to the burner 122 of the fuel processing component means. The split oxidant passage also includes an exhaust branch 32 that delivers an exhaust portion of the oxidant stream from the cathode flow field 22 of the fuel cell 12 to a plant exhaust passage 98.

The split oxidant passage 28 may also include a second reformer feed branch 154 that delivers a second reformer feed portion of the process oxidant stream from the exhaust branch 32 of the split oxidant passage 28 to the burner 122, so that water from the fuel cell 12, such as product water formed at the cathode catalyst 66 (shown in FIG. 2) is directed into the fuel processing component means, such as into the burner 122, as shown in FIG. 1. Additionally, by passing a portion of the combusted burner exhaust stream through the burner discharge line 142 and into the plant exhaust passage 98, an additional portion of water leaving the fuel cell 12 is thereby directed into the mass and heat transfer device 96 wherein the additional moisture within the anode exhaust stream and combusted burner exhaust stream is directly transferred into the process oxidant stream entering the plant within the inlet branch 30 of the split oxidant passage 28, in order to further support water balance of the system 10.

Figure 3:
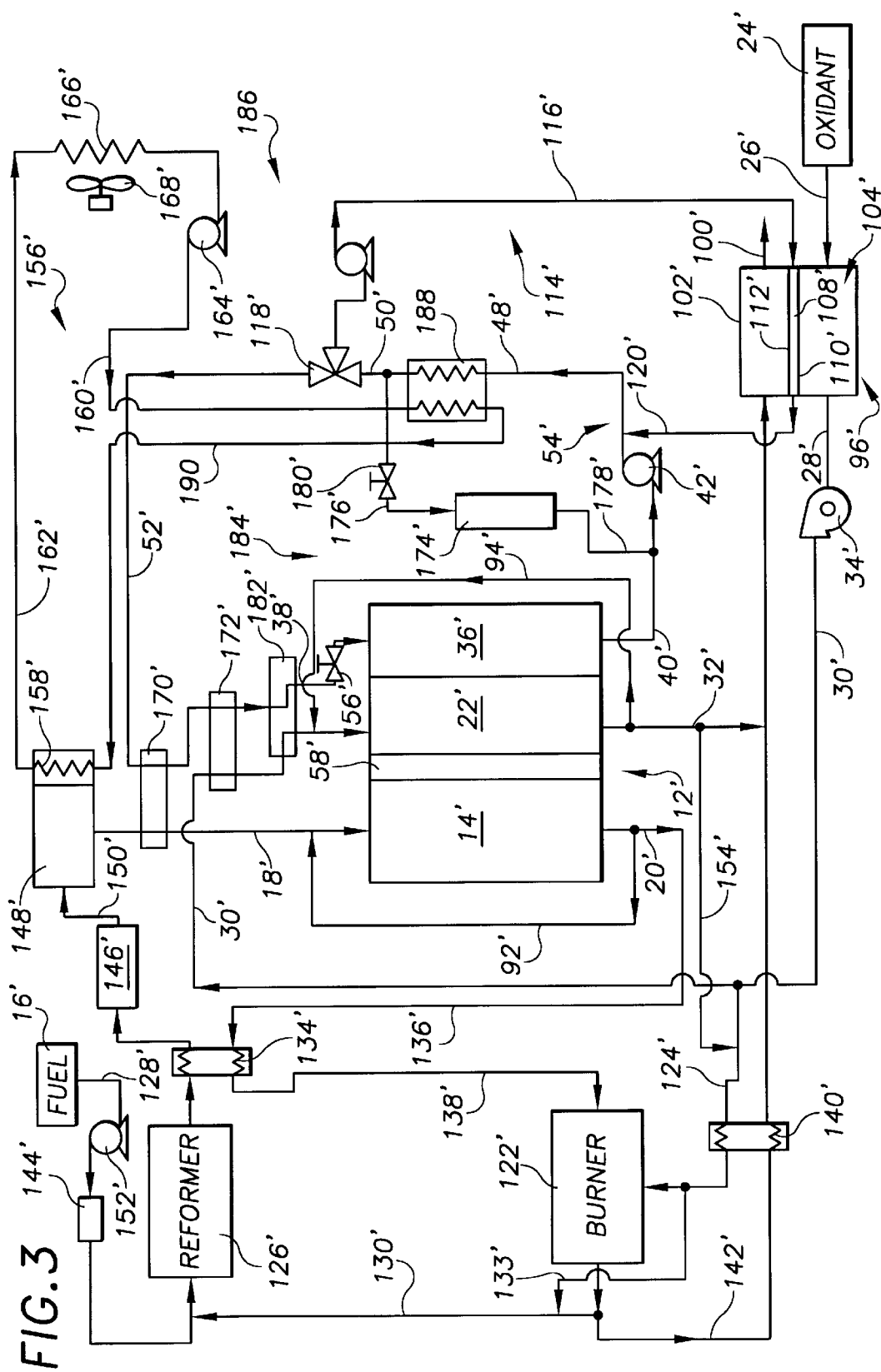
FIG. 3 is a schematic representation of a second embodiment of an operating system for a direct antifreeze cooled fuel cell power plant constructed in accordance with the present invention.

The fuel processing component means may also include a fuel processing thermal exchange loop means 156 having a third heat exchanger 158 secured in heat exchange relationship with the reformed fuel passing through the selective oxidizer 148 (as shown in FIGS. 1 and 3), or secured on the reducing fluid inlet 18 between the selective oxidizer 148 and the fuel cell 12, for passing the reformed fuel in heat exchange relationship with a second cooling fluid passing through the third heat exchanger 158 to remove heat from the reformed fuel that the fuel receives as a result of the reaction within the selective oxidizer 148. The fuel processing thermal exchange loop 156 may also include a second coolant feed line 160 that directs the second cooling fluid to the third heat exchanger; a second coolant return line 162 that carries the second coolant from the third heat exchanger 158; a second coolant pump 164 secured on the second coolant feed line 160 (as shown in FIGS. 1 and 3), or on the second coolant return line 162 for pumping the second cooling fluid; a second coolant heat exchanger 166 secured between the second coolant return line 162 and the second coolant feed line 160 for removing heat from the second cooling fluid; and a second coolant fan 168 for passing air through the second coolant heat exchanger 166 for removing heat from the second cooling fluid within the second coolant heat exchanger 166. The second cooling fluid may be a conventional antifreeze, or may be one of the above-described direct antifreeze solutions, a special direct antifreeze solution, or an alkanetriol direct antifreeze solution.

The operating system for a direct antifreeze cooled fuel cell power plant 10 also includes additional components that serve to humidify the reducing fluid and process oxidant reactant streams entering the anode flow field 14 of the fuel cell 12. One such component is a fuel saturator 170 secured to the third extension 52 of the coolant feed line 38 and the reducing fluid or fuel inlet 18. A similar component is an oxidant saturator 172 secured to the third extension 52 of the coolant feed line 38 and to the inlet branch 30 of the split oxidant passage 28. The fuel and oxidant saturators 170, 172 may be any fuel or oxidant saturator means such as known mass transfer apparatus for effecting mass transfer between a liquid stream and a gas stream, such as well known packed beds, wetted films, spray towers, or the like. It is well known that with packed beds, etc., liquid water within the direct antifreeze solution cooling fluid will vaporize and pass into the gaseous reducing fluid and process streams to increase the humidity of the reducing fluid and process oxidant reactant streams.

As shown in FIGS. 1 and 3, the operating system for a direct antifreeze cooled fuel cell power plant 10 also includes components for treating the direct antifreeze solution. The components include a demineralizer 174 secured in fluid communication with the thermal management system 54 through a demineralizer feed line 176 secured to the demineralizer 174 and the second extension of the coolant feed line 50, down stream from the coolant pump 42 and coolant heat exchanger 44. The demineralizer 174 is a standard demineralizer that contains ion exchange resins which absorb dissolved ions in the cooling fluid. The demineralizer 174 thereby maintains a low conductivity in the coolant thus minimizing shunt current corrosion within fuel cell coolant manifolds. A demineralizer return line 178 directs the portion of the cooling fluid passing from the second extension of the coolant feed line 50 and through the demineralizer 174 back into the thermal management system 54, for example at the coolant discharge line 40. A second coolant trim valve means 180 may be secured to the demineralizer feed line 176 for controlling a rate of circulation of the cooling fluid from the demineralizer 174 into the thermal management system 54 and back into the demineralizer 174, as shown in FIG. 1. The demineralizer 174 may be any known demineralizer means for removing dissolved metals in the cooling fluid solution, such as the demineralizer shown in the aforesaid U.S. Pat. No. 4,344,850 to Grasso, which Patent is owned by the assignee of all rights in the present invention.

An additional component for treating the direct antifreeze solution cooling fluid is a degasifier 182. The degasifier removes dissolved gases, such as carbon dioxide, from the cooling fluid. This decreases a demand on the demineralizer 174 because the carbon dioxide hydrolyzes to carbonic acid. The degasifier 182 is secured to the third extension 52 of the coolant feed line 38 up stream of the fuel cell 12, and also secured to the inlet branch 30 of the split oxidant passage 28, again upstream of the cell 12. The degasifier 182 may be a degasifier means for removing dissolved contaminants in the direct antifreeze solution, such as dissolved $CO_2$, $NH_3$, etc., and like the fuel and oxidant saturators 170, 172, in the FIG. 1 schematic representation, the lines for the coolant feed line third extension 52 and inlet branch 30 of the split oxidant passage 28 pass through the schematic box for the degasifier 182 to indicate the degasifier 182 means affords mass transfer of the dissolved contaminants from the liquid cooling fluid direct antifreeze solution stream into the gaseous process oxidant stream. The degasifier 182 may therefore be any known mass transfer apparatus capable of effecting mass transfer between a liquid stream and a gaseous stream, including well known packed beds, wetted films, spray towers, etc. The demineralizer 174, degasifier 182 and the described coolant feed lines and oxidant inlet branch 30 that direct the direct antifreeze solution and oxidant stream to treat the cooling fluid comprise a water treatment system 184.

Because of the above described low volatility and other characteristics of the direct, special direct and alkanetriol direct antifreeze solutions used as the cooling fluid in the operating system for a direct antifreeze cooled fuel cell power plant 10, the cooling fluid does not evaporate out of the degasifier 182 (or fuel and oxidant saturators 170, 172 for the same reasons) at unacceptable levels. Instead the cooling fluid is effectively treated by the demineralizer 174 and degasifier 182 to remove contaminants that could deteriorate the cooling fluid by increasing its conductivity which could lead to shunt current corrosion in coolant channels 82, 86, or in the manifolds of the cell 12 resulting in degraded performance of the operating system 10.

A second embodiment 186 of the operating system for a direct antifreeze cooled fuel cell power plant is shown schematically in FIG. 3, and includes many components that are virtually identical to components shown in FIG. 1 and described above. The virtually identical components in FIG. 3 are designated in FIG. 3 and herein as primes of the reference numeral utilized for the same or similar component in FIG. 1 for efficiency. For example, in FIG. 1, the anode flow field is designated by the reference numeral 14, and in FIG. 3, the anode flow field of the second embodiment of the operating system 142 is designated by the reference numeral 14'.

The second embodiment of the operating system for a direct antifreeze cooled fuel cell power plant 142 differs from the FIG. 1 embodiment by having the second coolant feed line 160' pass through a coolant-coolant heat exchanger 188 that is also secured to the coolant feed line 38', such as at the first extension 48' of the feed line 38' downstream of the coolant pump 42'. A second coolant feed line extension 190 is secured between the coolant-coolant heat exchanger 188 and the third heat exchanger 158' so that the second cooling fluid thereby serves to remove heat from the direct antifreeze solution cooling fluid within the thermal management system 54', and transfers that heat to be removed from the operating system 186 through the second coolant heat exchanger 166'.

As shown in FIG. 3, by use of the coolant-coolant heat exchanger 188 in cooperation as described with the second coolant heat exchanger 166', the coolant fan 46 may be eliminated. A substantial advantage of using two antifreeze solutions is that the direct antifreeze solution can be used in portions of the operating system 10 where the surface tension and vapor pressure requirements of the antifreeze are critical such as the fuel cell 12, the fuel and oxidant saturators 170, 172, the degasifier 182 and the direct mass and heat transfer device 96. A conventional antifreeze may be used in less critical portions of the operating system 10, such as the second heat exchanger 166 or radiator for cooling the total power plant, the third heat exchanger 158 for cooling the selective oxidizer 148. The conventional antifreeze may contain inhibitors which are well-known to prevent corrosion of materials used in conventional cooling systems which thereby permit use of lower cost materials. Additionally, in the second embodiment of the operating system 186, if the second cooling fluid is a conventional antifreeze, the second coolant heat exchanger 166' may be exposed to moving ambient air (such as by the second cooling fan 168', or by movement of a vehicle (not shown) powered by the operating system 186 through ambient air, or by both), and may only have a conventional antifreeze passing through it. Therefore, the special direct antifreeze solution passing through the thermal management system 54' would be further protected against loss from the operating system 186, for example by a damaging impact of a foreign object in the ambient air contacting and damaging the second coolant heat exchanger 166'.

In use of the second embodiment of the operating system for a direct antifreeze cooled fuel cell 186 to power a transportation vehicle, the second coolant heat exchanger 166' could be structured much like a conventional automobile radiator to take advantage of ambient air currents. Therefore it would be subject to potential damage from foreign objects and ordinary wear and tear. By use of the coolant-coolant heat exchanger 188, the more costly direct antifreeze solutions would be protected from any loss resulting from such radiator damage.

By integrating the direct antifreeze solutions with the above described thermal management system 54, water treatment system 184, and direct mass and heat transfer means 96, the operating system for a direct antifreeze cooled fuel cell power plant 10 is able to minimize an amount of free water within the power plant 10 that is susceptible to freezing when the system 10 is operated in, or between operating periods in, sub-freezing ambient conditions, while also minimizing weight, cost and volume requirements for producing such an operating system 10 compared to known fuel cell power plant operating systems that may be capable of operating a vehicle in sub-freezing conditions.

An exemplary fuel cell including a PEM electrolyte, wetproofed anode and cathode substrates 70, 76 and anode and cathode diffusion layers 72, 78 demonstrated efficient test performance without unacceptable adsorption of a glycerol-water direct antifreeze solution to the anode or cathode catalysts 64, 66. The exemplary fuel cell included a PEM electrolyte within a membrane electrode assembly acquired from W.L. Gore and Associates, Inc. of Elkton, Md. as product identification no. "PRIMEA—5560".

The porous anode and cathode substrate layers were porous carbon—carbon fibrous composite and were acquired as grade TGP-H-060 from the Toray Company of New York, N.Y. The anode and cathode substrate layers were a preferred embodiment, being uniformly wetproofed with Teflon grade "FEP—121" sold by the E.I. DuPont Company, of Willmington, Del., by wetproofing procedures well-known in the art.

The porous anode and cathode gas diffusion layers were applied to both the anode and cathode substrates by procedures well-known in the art and described in U.S. Pat. No. 4,233,181, which patent is owned by the assignee of all rights in the present invention, and which patent is hereby incorporated herein by reference. The anode and cathode diffusion layers consisted of about 50 percent Vulcan XC-72 obtained from the Cabot Corporation of Billerica, Mass. and about 50 percent Teflon, grade "TFE—30", obtained from the aforesaid E. I. Dupont Company.

The cell anode and cathode flow fields were porous and defined within anode and cathode water transport plates. The water transport plates were porous graphite having a mean pore size of approximately 2–3 microns. The plates were made wettable by treating them with tin oxide in a procedure described in U.S. Pat. No. 5,840,414 owned by the assignee of all rights in the present invention, which patent is here by incorporated herein by reference.

A process oxidant stream flowing through the cell defined as a single pass oxidant flow pattern is characterized herein for convenience as an oxidant flow axis between and oxidant inlet and an oxidant outlet for purposes of comparison to flow patterns of the reducing fluid and antifreeze solution coolant streams passing through the cell. The reducing fluid defined a two-pass reducing fluid pattern flowing essentially perpendicular the oxidant flow axis, crossing the oxidant flow axis twice, and flowing also in a direction generally from the oxidant inlet to the oxidant outlet. The antifreeze solution coolant stream defined a three-pass flow pattern essentially perpendicular to the oxidant flow axis, crossing the oxidant flow axis about three times and flowing generally in a direction from the oxidant outlet to the oxidant inlet. For purposes of convenience, the aforesaid reducing fluid flow pattern will be referred to as transverse-concurrent to the oxidant flow axis, and the aforesaid antifreeze solution coolant stream flow pattern will be referred to as transverse-opposite to the oxidant flow axis. Although this test was done with an antifreeze solution coolant stream flow pattern that was transverse-opposite to the oxidant flow axis, a preferred configuration is transverse-concurrent because that minimizes a cell temperature at the oxidant inlet which maximizes local relative humidity, thereby minimizing humidification requirements and also minimizing drying of the electrolyte.

The cell was operated at a nominal temperature of 65 degrees centigrade (hereafter "° C") and was nearly isothermal to within approximately plus or minus 5° C. The fuel used for the test performance of the exemplary cell was hydrogen. The fuel was humidified to approximately 100 percent relative humidity at 65° C. The fuel flow was varied in proportion to the current density of the cell to maintain a hydrogen utilization of 80 percent ("%"). The fuel pressure was approximately 14.7 PSIA. The oxidant used for the test was air. The oxidant was humidified over a range of approximately 0–100% relative humidity at 65° C. by passing the process oxidant stream through a standard saturator. The oxidant flow was varied in proportion to the current density of the cell to maintain an oxygen utilization of 30%. The oxidant pressure was approximately 14.7 PSIA.

The coolant stream used for the test ranged from pure water to 65% glycerol and 35% water. The glycerol used was a certified ACS grade 99.9% glycerol. It is pointed out that use herein of the word "glycerol" as a form of antifreeze solution cooling fluid is meant to include "glycerin", where "glycerin" is understood herein and in general acceptance to include glycerol and water solutions or mixtures. Concentration of the glycerol in the antifreeze solution (glycerol and water. e.g., "glycerine") was measured by determining the specific gravity of the glycerol and water solution at 20° C. The antifreeze solution coolant stream was circulated through coolant flow channels in both an anode and a cathode water transport plate that defined anode and cathode flow field channels. The inlet and exit temperatures of the coolant stream entering and leaving the cell were 65° C. plus or minus 5° C.

The cell was initially tested with pure water as the cooling fluid. The current density was set at 250 amps per square foot (hereafter "ASF") and the cell voltage was monitored over a period of about 4 hours. Both the fuel and the oxidant were saturated to approximately 100% relative humidity at 65° C. Subsequently the coolant composition was changed to approximately 15, 30, 50 and 65 weight percent glycerol. The performance was monitored for 4 hours after each change in glycerol concentration. The results are listed in Table 1.

TABLE 1

Cell Performance At 250 ASF At Varying Concentrations of Glycerol Antifreeze Solution

| % Glycerol | Initial Cell Voltage in Volts | Cell Voltage After 4 Hours in Volts |
| --- | --- | --- |
| 0 | 0.765 | 0.750 |
| 15 | 0.757 | 0.756 |
| 30 | 0.740 | 0.746 |
| 50 | 0.741 | 0.744 |
| 65 | 0.750 | 0.745 |

The tests producing the results listed in Table 1 were performed over a period of five days, and the tests and results are referred to herein for convenience as the "first tests" of an operating system for a direct antifreeze cooled fuel cell. The coolant flow rate was maintained 65° C. plus or minus 5° C. at all time during the test. The data in Table 1 demonstrate that there is no adverse effect on performance of replacing water as the coolant with an antifreeze solution that contains up to 65% glycerol.

In a second series of tests, the glycerol concentration was maintained at approximately 60% and the relative humidity of the process oxidant stream was varied from 0% to 100% at the fuel cell oxidant inlet. All of the test parameters of the first tests were as described above for the second tests. The relative humidity of the process oxidant stream was varied from approximately 100% to 57%, 31%, 16% and 0%. The performance of the cell was monitored for 4 hours after each change in oxidant relative humidity. The results of the second tests are listed in Table 2.

TABLE 2

Cell Performance at 250 ASF at Varying Oxidant Relative Humidity % With 60% Glycerol Antifreeze Solution

| Oxidant % Relative Humidity | Initial Cell Voltage in Volts | Cell Voltage After 4 Hours in Volts |
| --- | --- | --- |
| 100 | 0.735 | 0.742 |
| 57 | 0.731 | 0.740 |
| 31 | 0.742 | 0.732 |
| 16 | 0.748 | 0.696 |
| 0 | 0.748 | 0.682* |

*Cell voltage after only one hour.

The data in Table 2 of the second tests demonstrate that there is an adverse effect on fuel cell performance of reducing the process oxidant relative humidity at the fuel cell oxidant inlet below approximately 30% relative humidity. At a process oxidant relative humidity of below 30% within the cathode flow field, the antifreeze solution draws moisture out of the process oxidant stream into the cathode water transport plate. Therefore, moisture moves out of the proton exchange membrane (PEM) into the process oxidant stream at a rate that effectively dehydrates the PEM, and therefore results in a decreased performance of the cell.

In yet another, or third test a 2 inch by 2 inch PEM cell containing a membrane electrode assembly, model no. "PRIMEA-5510", obtained from the aforesaid W.L. Gore Associates Company, was tested. The cell configuration was identical to the previously described tests except that the anode catalyst was 0.4 milligrams per square centimeter of platinum, and there was no coolant.

The cell was operated at 14.7 PSIA at 65° C. on hydrogen and air saturated to about 100% relative humidity with respective utilizations of 80% and 30% at 500 amperes per square foot ("ASF"). A portion of the dry oxidant was passed through a saturator filled with glycerol and then mixed with the humidified air prior to introduction to the cell. The glycerol concentration in the vapor at the oxidant inlet 74 was set to be approximately 4 parts per million which is the equilibrium concentration of glycerol above a 55 weight per cent glycerol solution at 65° C. The objective was to evaluate how quickly glycerol poisoned the cell. This test was run for 16 hours. During this time the cell voltage decayed from an initial value of 0.683 volts to a final value of 0.638 volts. The potential of both electrodes was raised to an air open circuit potential. The performance of the cell after this treatment was that the cell recovered to 0.681 volts.

Cyclic voltammetry on this cell in another, or fourth test showed that glycerol did slowly adsorb onto the anode catalyst; but was cleanly oxidized at a potential of approximately 0.5 volts versus a hydrogen reference electrode.

These tests demonstrate that glycerol is oxidized in a PEM cell in the potential range of typical PEM cells. The normal potential excursions of the electrode during start-up and shutdown of a fuel cell used in vehicular applications should be sufficient to oxidize trace quantities of antifreeze solution which may come into contact with the anode and/or cathode catalysts.

The first and second tests also establish that the direct antifreeze cooled fuel cell 12 can maintain an efficient level of performance, and that having a direct antifreeze solution in direct fluid communication with the cathode catalyst does not significantly deteriorate cell performance as a result of any adsorption by the cathode catalyst of the antifreeze solution and resulting poisoning of the cell. The cell used in these tests was exposed to a glycerol-water solution for approximately 500 hours hot time at 65° C. and for 125 hours of load time without exhibiting any adverse performance loss.

Moreover, the results of the first and second tests indicate that in a preferred embodiment the optionally wetproofed or hydrophobic cathode and anode substrate layers and wetproofed or hydrophobic cathode and anode gas diffusion layers effectively limit movement of any significant amount of antifreeze solution from the water transport plates into the membrane electrode assembly where the antifreeze solution would poison the catalysts in the cell. Furthermore, water management dynamics within the cell create a water rich antifreeze solution at the interface between the reactant fluids and the water transport plates. This effectively lowers the antifreeze concentration at this interface which further limits the amount of antifreeze available for transfer to the membrane electrode assembly by diffusion. At the anode catalyst, water condenses from the saturated reducing fluid stream, thus creating a water rich reactant fluid—water transport plate interface. At the cathode catalyst, the production of water and its subsequent flow as a liquid or diffusion as a vapor from the cathode catalyst to the cathode water transport plate also results in a water rich reactant fluid—water transport plate interface.

Figure 4:
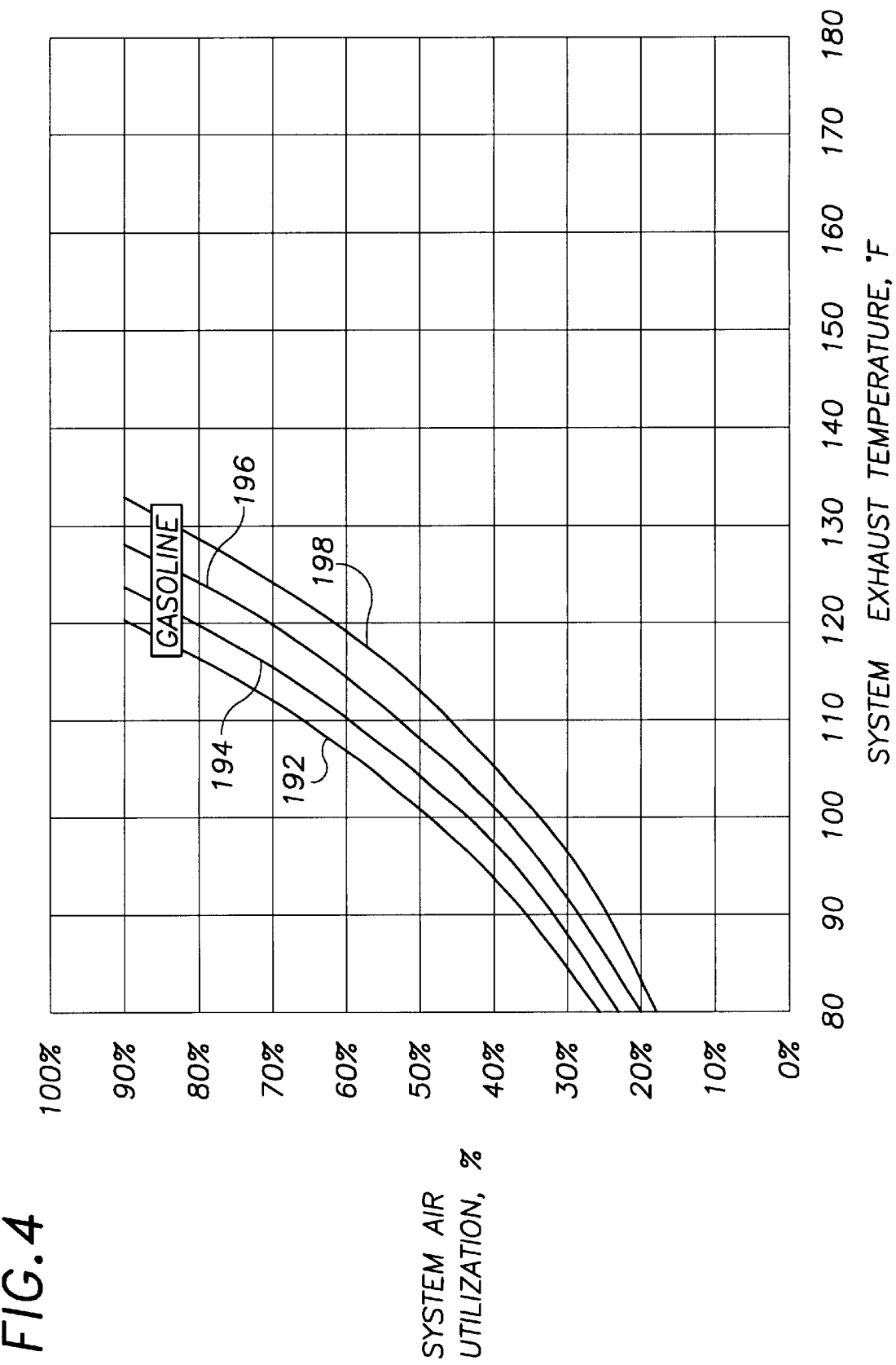
FIG. 4 is graph showing exhaust stream temperatures plotted for various rates of oxygen utilization by an operating system for a direct antifreeze cooled fuel cell power plant of the present invention.

FIG. 4 is a graph showing plots of allowable air or oxidant utilization by the fuel cell 12 to maintain water balance in the operating system for a direct antifreeze cooled fuel cell power plant 10 operated at about ambient pressure as a function of a temperature of the system exhaust stream for a gasoline fueled fuel cell 12 where a direct antifreeze solution is utilized in varying concentrations and the relative humidity of the process oxidant stream varies. Going from left to right on the FIG. 4 graph, the first plot line 192 shows the system air utilization and exhaust temperature at water balance when the cooling fluid passing through the cathode water transport plate 74 is at 0% glycerol, at a freezing temperature of 32° F., and the oxidant is at 100% relative humidity. For the second plot line 194, the direct antifreeze solution is at 33% glycerol, at a freezing temperature of 12° F., and the oxidant is at 90% relative humidity. For the third plot line 196, the direct antifreeze solution is at 52% glycerol, at a freezing temperature of −13° F., and the process oxidant stream is at 80% relative humidity. For the fourth plot line, 198, the direct antifreeze solution is at 65% glycerol, at a freezing point of −49° F., and the process oxidant stream is at 70% relative humidity.

The four plot lines 192, 194, 196, and 198 of FIG. 4 represent limits under which the operating system for a direct antifreeze cooled fuel cell power plant 10 will remain in water balance. For example, with respect to the fourth plot line 198, if the air utilization is 45%, then the operating system will remain in water balance provided the system exhaust temperature, measured for example at the plant exhaust vent 100, remains at or below 110° F. If the system exhaust temperature were to suddenly increase beyond 110° F., for example resulting from an increase in temperature of an ambient air oxidant supply 24, then system controls could simply control the blower 34 to increase air utilization by the fuel cell 12. It has been determined that an optimal operating system 10 will employ a direct antifreeze solution that is 65% glycerol, wherein the system air utilizations is greater than 45%, and the system exhaust temperature is less than 110° F.

Using the information from the FIG. 4 graph, a formula has been developed that identifies the maximum temperature of the operating system 10 exhaust for differing system air utilization data and for differing concentrations of direct antifreeze in the direct antifreeze solution. The concentration of the direct antifreeze in the direct antifreeze solution is expressed as a "mole fraction of water", or "MFW" in the direct antifreeze solution. For example a MFW of 0.730 corresponds to 65% by weight of glycerol as the direct antifreeze solution, where glycerol has 35% by weight of water, or as in the formula MFW=0.7. The system air utilization plotted on the vertical axis of the FIG. 4 graph, is identified in the formula below as "$UO_2$". The formula to calculate the maximum system exhaust temperature ("TEX") that will allow the operating system 10 to operate in water balance for a gasoline fueled operating system 10 operated at about ambient pressure for a given air utilization and direct antifreeze concentration in the direct antifreeze solution is:

$$TEX = 1{,}000/((2.85528 - (2.85528^2 - (4 \times (-0.34911) \times (6.1893 - LOG_{10}(14.696/(7.14/UO_2 + 0.5)/MFW))))^{0.5})/(2 \times (-0.34911))) - 460$$

As is apparent, use of the direct antifreeze solution allows the system exhaust temperature to be increased for a given air utilization; or conversely, allows the air utilization to be increased for a given exhaust temperature. Increasing the air utilization decreases parasitic power required to pump the ambient air with the oxidant blower 34; while increasing the allowable system exhaust temperature facilitates achieving water balance in high temperature ambient conditions, thereby evidencing further benefits of the operating system for a direct antifreeze cooled fuel cell power plant 10.

It is stressed that by the phrase "in direct fluid communication with" used herein, it is meant that there are no physical barriers between respective components. For example, in the fuel cell 12 of the operating system for a direct antifreeze cooled fuel cell power plant 10, the porous cathode substrate 76 is secured in fluid communication with the cathode catalyst 66, and the cathode water transport plate 74 is secured in direct fluid communication with porous cathode substrate 76. Consequently, there are no solid barriers to gaseous and/or liquid flow between the cathode water transport plate 74 and the cathode catalyst 66. For example, it is known to utilize a semi-permeable membrane that restricts gaseous flow, but permits selective liquid communication between components on opposed sides of the membrane for purposes of humidifying gaseous reactant streams, etc. With the operating system for a direct antifreeze cooled fuel cell 10, no such physical barriers are positioned between the cathode water transport plate 74 and the cathode catalyst 66, and no such barriers are positioned between the anode water transport plate 68 and the anode catalyst 64.

It can be seen that in the operating system for a direct antifreeze cooled fuel cell power plant 10 almost all liquid water is exposed to the direct antifreeze solution, whether in the fuel cell 12 components, the thermal management system 54, the water treatment system 184, or the direct mass and heat transfer means 96, and hence will not freeze during operation of the cell 12, or during cell shut down. The water within the PEM electrolyte is not exposed to the direct antifreeze solution. However during operation of the cell 12, heat is generated by the well-known electrochemical reactions that prevent any freeze problems for water within the electrolyte. During shut down of the operating system for a direct antifreeze cooled fuel cell power plant 10, a portion of the relatively small amount of water within the electrolyte will evaporate and pass as a vapor through the adjacent porous anode and cathode diffusion and substrate layers into the cathode and anode water transport plates 74, 68, and simultaneously some of the antifreeze solution will evaporate and move into the electrolyte to lower the freezing temperature of a solution remaining in the electrolyte, thus also minimizing freezing and subsequent melt requirements for start up of the fuel cell 12. Upon start up, any antifreeze solution adsorbed by the cell anode and cathode catalysts 64, 66, or contained in the electrolyte 62, will be oxidized at the anode and cathode catalysts by the cell potentials during a start up procedure.

Accordingly, it can be seen that the unique physical and chemical properties of the operating system for a direct antifreeze cooled fuel cell power plant 10 cooperate to produce an unexpected result that using a direct antifreeze solution as a cooling fluid in direct fluid communication with cell anode and cathode catalysts 64, 66 does not significantly decrease cell performance, and that by integrating the direct antifreeze solution with the thermal management system 54, the water treatment system 184 and the direct mass and heat transfer device 96, components of those systems are also protected from problems associated with operating the plant at sub-freezing temperatures. Moreover, the split oxidant passage 28 with its inlet branch 30, exhaust branch 32, and first and second reformer feed branches 124, 154 further enables the operating system for a direct antifreeze cooled fuel cell power plant 10 to operate in reforming hydrocarbon fuels into an appropriate reducing fluid in water balance with a minimum of free water by directing water within the inlet and exhaust branch 30, 32 through the first and second reformer feed branches 124, 154 through the burner 122 and into the reformer 126. The direct mass and heat transfer device 96 further supports the operating system 10 by operating to restrict water loss from the system 10, and returning water exiting the fuel cell 12 back into components of the system 10 through the split oxidant passage 28. Therefore, the operating system also serves to support generation of electrical energy by the power plant in water balance with a minimum requirement for free water to supply the fuel processing components.

While the present invention has been described and illustrated with respect to particular constructions of an operating system for a direct antifreeze cooled fuel cell power plant 10, it is to be understood that the operating system is not to be limited to the described and illustrated embodiments. For example, while the test results of the exemplary fuel cell described above are for a cell utilizing a PEM electrolyte, the fuel cell 12 may use alternative electrolytes known in the art. Additionally, while the illustrated embodiment of an exemplary fuel cell at FIG. 2 shows an anode diffusion layer 72 between the anode substrate 70 and the anode catalyst 64, and shows a cathode diffusion layer 78 between the cathode substrate 76 and the cathode catalyst 66, it is to be understood that in an alternative embodiment of the fuel cell 12 the diffusion layers 72, 78 may be eliminated, and the cathode substrate 76 and anode substrate 70 may be secured adjacent to and supporting the cathode catalyst 66 and anode catalyst 64 respectively. Also, the cathode diffusion layer 78 or the cathode substrate 76 may not be wetproofed, unlike the test fuel cell used to provide the above described performance results. Further, while the required properties for a direct antifreeze solution have been described relative to a fuel cell operating at about 150° F., it is to be understood that the required properties are independent of the operating temperature of the fuel cell 12. As a further example, the above descriptions refer to fuel cells operated at about or slightly above ambient pressures, however the scope of the present invention includes application to more highly pressurized fuel cells. Consequently, reference should be made primarily to the following claims rather than the foregoing description to determine the scope of the invention.

What is claimed is:

1. An operating system for a direct antifreeze cooled fuel cell power plant that generates electrical energy from reducing fluid and process oxidant reactant streams, the operating system comprising:

a. at least one fuel cell means for producing electrical energy from the reducing fluid and process oxidant streams including an electrolyte secured between an anode catalyst and a cathode catalyst;

b. fuel processing component means including a burner that receives an anode exhaust stream from an anode exhaust passage secured between an anode flow field adjacent the anode catalyst and the burner and a reformer means in fluid communication with the fuel cell means for processing and reforming a hydrocarbon fuel into the reducing fluid;

c. a thermal management system means for controlling temperature within the power plant including a porous water transport plate secured in direct fluid communication with the cathode catalyst;

d. a direct antifreeze solution passing through the thermal management system for cooling the fuel cell means, wherein the direct antifreeze solution is an organic antifreeze solution that does not wet the cathode catalyst and that is non-volatile at cell operating temperatures; and, e. a split oxidant passage means for directing the process oxidant stream into and through the fuel cell means, for directing a reformer feed portion of the process oxidant stream through a reformer feed branch of the split oxidant passage to the fuel processing component means, and for directing an exhaust portion of the process exhaust stream through an exhaust branch of the split oxidant passage into a plant exhaust passage.

2. The operating system for a direct antifreeze cooled fuel cell power plant of claim 1, wherein the direct antifreeze solution is an alkanetriol direct antifreeze solution.

3. The operating system for a direct antifreeze cooled fuel cell power plant of claim 1, wherein the direct antifreeze solution is an alkanetriol direct antifreeze solution selected from the group consisting of glycerol, butanetriol, and pentanetriol.

4. The operating system for a direct antifreeze cooled fuel cell power plant of claim 1, wherein the direct antifreeze solution is a special direct antifreeze solution having;

a. a freezing point of at least −20° F.;

b. a surface tension greater than 60 dyne/cm at an operating temperature of the fuel cell;

c. a partial pressure of antifreeze above the solution at the cell operating temperature that is less than 0.005 mm Hg; and, d. a capacity of being oxidized by the anode and cathode catalysts at fuel cell voltages.

5. The operating system for a direct antifreeze cooled fuel cell power plant of claim 1, wherein the plant includes a pressure control means for maintaining a positive pressure differential between the reactant streams passing through the fuel cell means and the direct antifreeze solution passing through the porous water transport plate so that the reactant streams within the fuel cell are at a greater pressure than the direct antifreeze solution within the water transport plate.

6. The operating system for a direct antifreeze cooled fuel cell power plant of claim 1, wherein the split oxidant passage includes a first reformer feed branch that directs a first reformer feed portion of the process oxidant stream from an inlet branch of the split oxidant passage between an oxidant inlet and the fuel cell means to the burner.

7. The operating system for a direct antifreeze cooled fuel cell power plant of claim 6, wherein the split oxidant passage includes a second reformer feed branch that directs a second reformer feed portion from the exhaust branch of the split oxidant passage between the fuel cell means and the plant exhaust passage to the burner.

8. An operating system for a direct antifreeze cooled fuel cell power plant that generates electrical energy from reducing fluid and process oxidant reactant streams, the operating system comprising:

a. at least one fuel cell means for producing electrical energy from the reducing fluid and process oxidant streams including an electrolyte secured between an anode catalyst and a cathode catalyst;

b. fuel processing component means including a burner that receives an anode exhaust stream from an anode exhaust passage secured between an anode flow field adjacent the anode catalyst and the burner and a reformer means in fluid communication with the fuel cell means for processing and reforming a hydrocarbon fuel into the reducing fluid;

c. a thermal management system means for controlling temperature within the power plant including a porous water transport plate secured in direct fluid communication with the cathode catalyst;

d. a direct antifreeze solution passing through the thermal management system for cooling the fuel cell means, wherein the direct antifreeze solution is an organic antifreeze solution that does not wet the cathode catalyst and that is non-volatile at cell operating temperatures;

e. a split oxidant passage means for directing the process oxidant stream into and through the fuel cell means, for directing a reformer feed portion of the process oxidant stream through a reformer feed branch of the split oxidant passage to the fuel processing component means, and for directing an exhaust portion of the process exhaust stream through an exhaust branch of the split oxidant passage into a plant exhaust passage; and, f. a direct mass and heat transfer device means secured in fluid communication with both an oxidant inlet that directs the process oxidant stream into the fuel cell means and also with the plant exhaust passage that directs a plant exhaust stream out of the fuel cell means for directly transferring mass and heat exiting the plant from the plant exhaust stream into the plant within the process oxidant stream, the direct mass and heat transfer device including a mass transfer medium means for sorbing a polar fluid substance consisting of polar molecules within the plant exhaust stream and for desorbing the polar substance into the process oxidant stream, the mass transfer medium means being supported by a separator housing in mass transfer relationship between the oxidant and exhaust streams.

9. The operating system for a direct antifreeze cooled fuel cell power plant of claim 8 wherein the mass transfer medium means includes the direct antifreeze solution as a liquid transfer medium supplied through a liquid transfer medium feed line from the thermal management system means.

10. The operating system for a direct antifreeze cooled fuel cell power plant of claim 9, wherein a maximum system exhaust temperature for operation of the operating system in water balance is determined by the formula;

$$TEX=1,000/((2.85528-(2.85528^2-(4\times(-0.34911)\times(6.1893-LOG_{10}(14.696/(7.14/UO_2+0.5)/MFW))))^{0.5})/(2\times(-0.34911)))-460;$$

where "TEX" is a maximum system exhaust temp. °F., where "$UO_2$" is a system air utilization, and where "MFW" is a mole fraction of water for the direct antifreeze solution.

11. The operating system for a direct antifreeze cooled fuel cell power plant of claim 9, wherein the direct antifreeze solution is an alkanetriol direct antifreeze solution.

12. The operating system for a direct antifreeze cooled fuel cell power plant of claim 9, wherein the direct antifreeze solution is an alkanetriol direct antifreeze solution selected from the group consisting of glycerol, butanetriol, and pentanetriol.

13. The operating system for a direct antifreeze cooled fuel cell power plant of claim 9, wherein the direct antifreeze solution is a special direct antifreeze solution having;

a. a freezing point of at least −20° F.;

b. a surface tension greater than 60 dyne/cm at an operating temperature of the fuel cell;

c. a partial pressure of antifreeze above the solution at the cell operating temperature that is less than 0.005 mm Hg; and, d. a capacity of being oxidized by the anode and cathode catalysts at fuel cell voltages.

14. The operating system for a direct antifreeze cooled fuel cell power plant of claim 8, wherein the plant includes a pressure control means for maintaining a positive pressure differential between the reactant streams passing through the fuel cell means and the direct antifreeze solution passing through the porous water transport plate so that the reactant streams within the fuel cell are at a greater pressure than the direct antifreeze solution within the water transport plate.

15. The operating system for a direct antifreeze cooled fuel cell power plant of claim 8, wherein the split oxidant passage includes a first reformer feed branch that directs a first reformer feed portion of the process oxidant stream from an inlet branch of the split oxidant passage between an oxidant inlet and the fuel cell means to the burner.

16. The operating system for a direct antifreeze cooled fuel cell power plant of claim 15, wherein the split oxidant passage includes a second reformer feed branch that directs a second reformer feed portion from the exhaust branch of the split oxidant passage between the fuel cell means and the plant exhaust passage to the burner.

17. An operating system for a direct antifreeze cooled fuel cell power plant that generates electrical energy from reducing fluid and process oxidant reactant streams, the operating system comprising:

a. at least one fuel cell means for producing electrical energy from the reducing fluid and process oxidant streams including an electrolyte secured between an anode catalyst and a cathode catalyst;

b. fuel processing component means including a burner that receives an anode exhaust stream from an anode exhaust passage secured between an anode flow field adjacent the anode catalyst and the burner and a reformer means in fluid communication with the fuel cell means for processing and reforming a hydrocarbon fuel into the reducing fluid;

c. a thermal management system means for controlling temperature within the power plant including a porous water transport plate secured in direct fluid communication with the cathode catalyst;

d. a direct antifreeze solution cooling fluid passing through the thermal management system for cooling the fuel cell means, wherein the direct antifreeze solution is an organic antifreeze solution that does not wet the cathode catalyst and that is non-volatile at cell operating temperatures;

e. a split oxidant passage means for directing the process oxidant stream into and through the fuel cell means, for directing a reformer feed portion of the process oxidant stream through a reformer feed branch of the split oxidant passage to the fuel processing component means, and for directing an exhaust portion of the process exhaust stream through an exhaust branch of the split oxidant passage into a plant exhaust passage; and, f. a fuel processing thermal exchange loop means including a heat exchanger secured in heat exchange relationship with reformed fuel heated by a selective oxidizer of the fuel processing component means for passing a second cooling fluid through the heat exchanger to remove heat from the reformed fuel.

18. The operating system for a direct antifreeze cooled fuel cell power plant of claim 17, wherein the fuel processing thermal exchange loop means further comprises a coolant-coolant heat exchanger secured in heat exchange relationship with the thermal management system means that directs the second cooling fluid in heat exchange relationship with the direct antifreeze solution cooling fluid.

19. The operating system for a direct antifreeze cooled fuel cell power plant of claim 17, wherein the direct antifreeze solution is an alkanetriol direct antifreeze solution.

20. The operating system for a direct antifreeze cooled fuel cell power plant of claim 17, wherein the direct antifreeze solution is an alkanetriol direct antifreeze solution selected from the group consisting of glycerol, butanetriol, and pentanetriol.

21. The operating system for a direct antifreeze cooled fuel cell power plant of claim 17, wherein the direct antifreeze solution is a special direct antifreeze solution having;

a. a freezing point of at least −20° F.;

b. a surface tension greater than 60 dyne/cm at an operating temperature of the fuel cell;

c. a partial pressure of antifreeze above the solution at the cell operating temperature that is less than 0.005 mm Hg; and, d. a capacity of being oxidized by the anode and cathode catalysts at fuel cell voltages.

22. The operating system for a direct antifreeze cooled fuel cell power plant of claim 17, wherein the plant includes a pressure control means for maintaining a positive pressure differential between the reactant streams passing through the fuel cell means and the direct antifreeze solution passing through the porous water transport plate so that the reactant streams within the fuel cell are at a greater pressure than the direct antifreeze solution within the water transport plate.

23. The operating system for a direct antifreeze cooled fuel cell power plant of claim 17 wherein the split oxidant passage includes a first reformer feed branch that directs a first reformer feed portion of the process oxidant stream from an inlet branch of the split oxidant passage between an oxidant inlet and the fuel cell means to the burner.

24. The operating system for a direct antifreeze cooled fuel cell power plant of claim 23, wherein the split oxidant passage includes a second reformer feed branch that directs a second reformer feed portion from the exhaust branch of the split oxidant passage between the fuel cell means and the plant exhaust passage to the burner.

25. The operating system for a direct antifreeze cooled fuel cell power plant of claim 17, further comprising a direct mass and heat transfer device means secured in fluid communication with both an oxidant inlet that directs the process oxidant stream into the fuel cell means and also with the plant exhaust passage that directs a plant exhaust stream out of the fuel cell means for directly transferring mass and heat exiting the plant from the plant exhaust stream into the plant within the process oxidant stream, the direct mass and heat transfer device including a mass transfer medium means for sorbing a polar fluid substance consisting of polar molecules within the plant exhaust stream and for desorbing the polar substance into the process oxidant stream, the mass transfer medium means being supported by a separator housing in mass transfer relationship between the oxidant and exhaust streams.

26. The operating system for a direct antifreeze cooled fuel cell power plant of claim 25, wherein the mass transfer medium means includes the direct antifreeze solution as a liquid transfer medium supplied through a liquid transfer medium feed line from the thermal management system means.

27. The operating system for a direct antifreeze cooled fuel cell power plant of claim 25, wherein the mass transfer medium means comprises an enthalpy exchange barrier including a support matrix means defining hydrophillic pores having a pore-size range of between 0.1–100 microns for supporting a liquid transfer medium.

28. The operating system for a direct antifreeze cooled fuel cell power plant of claim 17, wherein the system further comprises a water treatment system means for treating the direct antifreeze solution, including a demineralizer secured in fluid communication with the thermal management system through a demineralizer feed line and return line secured to the thermal management system for passing the direct antifreeze solution through the demineralizer, and including a degasifier means secured in mass transfer relationship between the thermal management system and an oxidant inlet that directs the process oxidant into the fuel cell for removing dissolved contaminants in the direct antifreeze solution.

* * * * *